United States Patent Office 3,042,650
Patented July 3, 1962

3,042,650
BLOCK POLYESTERS AND PROCESS FOR PRODUCING SAME
Theodore E. Bockstahler, Moorestown, N.J., assignor to Rohm & Haas Company, Philadelphia, Pa., a corporation of Delaware
No Drawing. Filed June 16, 1958, Ser. No. 742,001
23 Claims. (Cl. 260—45.4)

This invention relates to a new process for the preparation of substantially linear high molecular weight unsaturated polyesters with controlled molecular configuration and the products produced by said process.

A further object of this invention is to make possible the preparation of unsaturated polyesters in which the degree of unsaturation is much higher than heretofore possible.

A further object of this invention is to provide a process which permits control of the arrangement or configuration of the different groups within the polymer chain and to provide a method which substantially eliminates the objectionable cross-linking of polymer chains encountered when employing the processes for the preparation of polyesters as set forth in the prior art.

A specific object of this invention is to provide substantially linear high molecular weight unsaturated polyesters which, when copolymerized with ethylenically unsaturated monomers, yield cross-linked thermoset polymers which exhibit superior physical properties.

The process of this invention comprises reacting a high molecular weight linear polyester free from non-benzenoid unsaturation (hereinafter referred to as the saturated polyester), the molecule chains of which are terminated with hydroxyl and/or carboxyl groups with the monoglycol, bisglycol, or polyester formed by the interaction of glycols or mixtures thereof with α,β-monoethylenically unsaturated dicarboxylic acids, said polyester chains being terminated with hydroxyl and/or carboxyl groups, at elevated temperatures; i.e., in the range of about 150° to about 250° C. with or without an esterification or transesterification catalyst, until the reaction is complete as indicated by the amount of by-product which is collected and measured. The preferred embodiments carry out the reaction in vacuo. The reaction conditions employed depend on the reactants used and this interdependency is set forth in detail hereinafter.

The preparation of relatively high molecular weight unsaturated polyesters either for copolymerization with monoethylenically unsaturated monomers or for other varied uses is well-known in the art, but because of the methods employed in their preparation, frequently referred to as "one stage" methods, they are not linear, nor is it possible to control the molecular configuration. Furthermore, because of the very reactive form in which the reactants are used, and the necessity for prolonged reaction times at elevated temperatures, there is a marked tendency for the molecules to cross-link with resultant high viscosity at comparatively low molecular weight, followed by gelation of the entire reaction mass if the reaction is continued. For this reason, and to ensure reasonable safety in large scale operations, the proportion of the unsaturated dicarboxylic acid which is used, the most reactive reactant, must be maintained at a low level. Since, when polymerized in conjunction with monoethylenically unsaturated monomers, the degree of unsaturation of the polyester controls the degree of reactivity of the mixture and the heat distortion temperature of the resultant polymer, it is obvious that a high degree of unsaturation in the polyester is most desirable.

In the "one stage" process, a mixture of the saturated dicarboxylic acid, the unsaturated dicarboxylic acid, and a glycol or mixture of glycols are heated until the desired degree of reaction, generally measured by the viscosity of the polymer or a solution thereof, is reached. Because all three reactants are present during the earlier portion of the reaction period in their monomolecular forms, a random configuration, heterogeneous cross-linked polymer results. No control of the molecular configuration is possible. This reaction is shown graphically as follows: A represents a molecule of saturated dicarboxylic acid; B represents a molecule of unsaturated dicarboxylic acid.

The polymer formed by the "one stage" method would be represented as simply as possible as follows, it being understood that each unit is connected to the adjacent unit by a glycol ester linkage and each terminal A or B unit bears a hydroxyl or carboxyl grouping attached thereto and that the number of units shown is without significance:

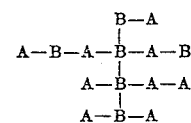

Thus, it is apparent that the high viscosity of the "one stage"-prepared resin is due to extensive cross-linking caused primarily by the unsaturated dicarboxylic acid component. If the reaction period is extended too long, the continued cross-linking causes gelation of the entire reaction mass.

The limitations on composition, molecular weight and molecular configuration which are imposed by the very nature of the "on stage" process for manufacturing polyesters are reflected in the limitations on the physical properties obtainable in the polymers prepared by polymerizing said "one stage" polyesters with a monoethylenicaly unsaturated monomer, such as styrene, vinyltoluene, etc. As a result of intensive research, it has been concluded that the presently available "one stage" polyesters give the maximum physical properties in polymers prepared therefrom that can be obtained by this particular method of preparation.

Despite the widespread use of "one stage" polyesters in combination with monoethylenically unsaturated monomers for the fabrication of a variety of articles, improved physical properties would broaden fields of application by opening new fields of use. Thus, methods of improving physical properties have been long sought. As hereinafter described, these sought-after improved physical properties are made possible by the present invention.

It has now been found that it is possible to make substantially linear high molecular weight unsaturated polyesters with controlled molecular configuration by employing the "two stage" process of the present invention. In this process, the first step comprises the preparation of a high molecular weight saturated linear polyester by reacting a dicarboxylic acid, free from non-benzenoid unsaturation, with glycols or mixtures of glycols employing processes well-known to those skilled in the art. The molecular weight of the saturated linear polyesters may be varied over a wide range depending on the type of end product desired, with the range of molecular weight being from about 1000 to about 10,000. A preferred range for polyesters designed primarily for use with monoethylenically unsaturated monomers is from about 2000 to about 5000. Depending on the ratio of the reactants employed, the saturated polyesters will have hydroxyl and/or carboxyl terminal groupings. The other reactant is a monoglycol ester, a bisglycol ester, or a polyester formed by the interaction of α,β-monoethylenically unsaturated dicarboxylic acids and glycols or mixtures thereof. The polyglycol ester is terminated with hydroxyl and/or carboxyl groupings, depending on the ratio of the reactants employed. The molecular weight of the polyester of the unsaturated dicarboxylic acid may vary appreciably being in the range of 300 to 4000. The molecular weight of said polyester may be varied somewhat depending on the molecular weight of the saturated polymer employed, but in the preferred embodiments it is from about 1000 to about 2000. These three glycol esters are prepared by the interaction of $\alpha,\beta$-monoethylenically unsaturated dicarboxylic acids with glycols or mixtures of glycols using preparative techniques well-known to those skilled in the art, varying the ratio of the reactants and the reaction conditions depending on the end product desired.

The compounds of the present invention are prepared by reacting the saturated polyester with the monoglycol ester or the bisglycol ester or the polyester of the desired $\alpha,\beta$-monoethylenically unsaturated dicarboxylic acid at temperatures of from about 150° to about 250° C., the preferred embodiment employing a vacuum system and an esterification or transesterification catalyst. Depending on the reactants employed, water or glycol will be evolved during the reaction and measurement of the quantity of the by-product evolved permits determination of the degree of completion of the reaction. The reaction may be shown graphically as follows, it being understood that each unit is connected to the adjoining unit by a glycol ester linkage, the terminal units having either a hydroxyl or carboxyl grouping attached thereto, and that the actual number of units shown is without significance:

A—A—A—A—A represents a saturated polyester.
B represents the monoglycol or bisglycol ester of the unsaturated acid.

B—B—B—A—A—A—A—A—B—B— is representative of the products of the present invention.

If a polyester of the unsaturated dicarboxylic acid and a glycol is employed as the reactant, the products have the same configuration as shown, but the formula for the reactant would be:

B—B—B

When contrasted with the graphic formula for the products of the "one stage" process shown hereinbefore, the lack of cross-linking and the control of the molecular configuration which is possible when using the process of the present invention is clearly evident. That the controlled configuration which can be imparted to the polyester of the present invention results in improved physical properties in a polymer formed by copolymerization of said polyester with a monoethylenically unsaturated monomer is shown hereinafter.

Acids suitable for the preparation of the saturated polyester, i.e. the polyester free from non-benzenoid unsaturation include the following: oxalic acid, malonic acid, succinic acid, glutaric acid, adipic acid, pimelic acid, suberic acid, azelaic acid, sebacic acid, brassylic acid, and thapsic acid, as well as mixtures thereof. Alkyl substituted derivatives of the hereinbefore listed saturated acids are also suitable including 2-ethylsuberic acid, 2,5-dimethyladipic acid, and 2,5-diethyladipic acid. Acids also suitable include the following: phthalic acid, isophthalic acid, terephthalic acid, benzophenone-2,4'-dicarboxylic acid, benzophenone-4,4'-dicarboxylic acid, diphenic acid, naphthalic acid, dinaphthyl ketone-2,2'-dicarboxylic acid, pentadecanedicarboxylic acid, tetracosanedicarboxylic acid, tetrahydrophthalic acid and endomethylene tetrahydrophthalic acid, as well as mixtures thereof.

Suitable $\alpha,\beta$-monoethylenically unsaturated dicarboxylic acids and anhydrides for the preparation of the monoglycol ester, the bisglycol ester or the polyester reactant include the following: maleic acid or anhydride, fumaric acid, glutaconic acid, $\alpha$-hydromuconic acid, itaconic acid, $\beta$-hydromuconic acid, and alkyl and aryl substituted derivatives of said acids. Typical of the latter class of compounds is dimethylmaleic anhydride.

Glycols suitable for the preparation of the saturated polyesters and the monoglycol esters, the bisglycol esters, and the polyesters of the $\alpha,\beta$-monoethylenically unsaturated dicarboxylic acid include the following: ethylene glycol, diethylene glycol, propylene glycol, dipropylene glycol, 1,4-butylene glycol, 1,5-pentanediol, 1,6-hexanediol, 2-ethyl-1,3-pentanediol, 2,4-dimethyl-1,3-pentanediol, 2,2-diethyl-1,3-propanediol, 2-isopropyl-2-methyl-1,3-propanediol, 2-isobutyl-2-methyl-1,3-propanediol, 2-tert-butyl-2-methyl-1,3-propanediol, 2-ethyl-2-isopropyl-1,3-propanediol, 2-ethyl-1,3-hexanediol, 2-isopropyl-1,3-pentanediol, 2-ethyl-4-methyl-1,3-pentanediol, 2,5-dimethyl-1,3-hexanediol, 2-methyl-1,3-octanediol, 2-ethyl-1,3-heptanediol, 2-isopropyl-1,3-hexanediol, 2-ethyl-2-tert-butyl-1,3-propanediol, 2-methyl-2-neopentyl-1,3-propanediol, 2-amyl-2-ethyl-1,3-propanediol, 2-tert-butyl-2-isopropyl-1,3-propanediol, 2-isopropyl-4,4'-dimethyl-1,3-pentanediol, 2-methyl-2-propyl-1,3-propanediol, 2,2-dimethyl-1,3-propanediol, 3-methylpentanediol-1,5, 1,3-butylene glycol, and 2-hexyl-2-methyl-1,3-propanediol. In these latter glycols, the alcoholic hydroxyl groups are attached at primary or secondary carbon atoms and the carbon atoms are in branched chain arrangement relative to the position of hydroxyl groups. Many of the glycols illustrated are obtainable from olefins through the "Oxo" reaction with carbon monoxide and hydrogen and reaction of the intermediate aldehyde with formaldehyde. Mixtures of glycols may be used as well as single glycols.

The optimum in block formation occurs when the saturated component is not readily saponifiable. These conditions obtain if the saturated polyester is prepared using a branched glycol and particularly if both the acid and the glycol of the saturated polyester are branched, and the glycol and acid components of the unsaturated component are essentially straight chain or "unhindered." A good example would be the reactants poly(2-methyl-2-propyl-1,3-propanediol-$\alpha,\alpha'$-diethyladipate) and hydroxyethyl acid maleate.

A further advantage of the "two stage" process of the present invention when compared with the "one stage" process of the prior art resides in the wider choice of structures possible because of the specific positioning of any chosen glycol possible by the "two stage" process. Thus, a single glycol or a mixture of glycols can be used in the preparation of the saturated polyester and the same or different glycol or mixture of glycols used in the preparation of the mono-, bis-, or polyesters of the unsaturated dicarboxylic acids.

The formation of the saturated polyester by the interaction of the dicarboxylic acid free from non-benzenoid unsaturation with glycols or mixtures thereof can be catalyzed by the addition of small amounts, from about The formation of the saturate dpolyester by the interaction of the dicarboxylic acid free from non-benzenoid unsaturation with glycols or mixtures thereof can be catalyzed by the addition of small amounts, from about 0.01 to about 2.0% on weight of the total charge, of a catalyst, such as zinc chloride, sodium acid sulfate, p-toluenesulfonic acid, tetrabutyl titanate, tetraisopropyl titanate, sulfuric acid, sodium methoxide, and zinc (metal) dust. Air may be excluded from the reaction mixture by sweeping out the apparatus with a gas such as hydrogen or nitrogen. The reaction is started usually by heating to reflux temperatures and then continuing the heating, taking off volatile materials, including azeotropic mixtures, and reducing the pressure as rapidly as conditions will permit. At the end point of about 200° C. to 220° C. the pressure in the reaction vessel is preferably carried down to 1 mm. to 15 mm.

The monoglycol ester of the unsaturated dicarboxylic acid is prepared by the interaction of 1 mole of glycol or a glycol mixture with 1 mole of acid or anhydride. Similarly, the bisglycol ester can be prepared by reacting 2 moles glycol or a glycol mixture with one mole of the unsaturated dicarboxylic acid or anhydride. The polyester of the unsaturated dicarboxylic acid is produced by processes well-known to those skilled in the art.

Coreaction of the saturated polyester and the glycol ester of α,β-monoethylenically unsaturated dicarboxylic acids is carried out at temperatures of from about 150° C. to about 250° C., preferably at about 170° to about 220° C., under moderately high vacuum and preferably in the presence of an esterification or transesterification catalyst, such as, for example, zinc chloride. If the monoglycol ester of the unsaturated dicarboxylic acid is reacted with a saturated polyester which is substantially hydroxyl terminated, water is produced as the main by-product. If the bisglycol ester of the unsaturated dicarboxylic acid is employed, then transesterification occurs with glycol being formed as a removable by-product. The degree of interaction can be determined by measuring the amount of by-product produced.

The reaction can be carried out in the presence or absence of solvents. If a solvent is used, it is preferably a non-reactive solvent which forms an azeotrope with water. Typical of such a solvent is xylene. The preferred embodiment of this invention does not utilize a solvent.

Although coreaction between the saturated polyester and the unsaturated acid-glycol ester is possible with widely varying ratios of hydroxyl to carboxyl groupings in both reactants, there are ratio ranges which represent the preferred embodiments of this invention. Thus, a preferred ratio is when both reactants have substantially equal hydroxyl and carboxyl groupings; i.e., the ratio of hydroxyl to carboxyl groupings in both reactants is from about 0.8:1 to about 1.0:0.8. Another preferred embodiment employs a saturated polyester which is essentially hydroxyl terminated with the unsaturated acid-glycol ester having substantially equal hydroxyl and carboxyl groupings. This condition obtains when a saturated polyester with terminal hydroxyl groupings is reacted with the monoglycol ester of the unsaturated dicarboxylic acid or when a saturated polyester with terminal hydroxyl groupings is reacted with a polyester of the unsaturated dicarboxylic acid in which the ratio of hydroxyl to carboxyl groupings is from about 0.8:1 to about 1:0.8.

The ratios of the two reactants employed can be varied over wide ranges without departing from the spirit of the present invention. The selection of the amount of unsaturated component to be used with the saturated component is determined by the desired reactivity and rigidity of the product produced when block polyesters of the present invention are polymerized with monoethylenically unsaturated monomers. Thus, compositions containing from about 2 mole percent to about 70 mole percent unsaturation represent the practical range, the actual degree of unsaturation used being further influenced by the specific acids and glycols employed in any given composition. Unsaturated polyester-resins containing unsaturation in the upper end of the range which can be prepared by the process of this invention were heretofore impossible to produce using the then known "one estage" process unless the molecular weights were so low that the resin was of limited value for the intended use. It is possible to produce high molecular weight polyesters containing a high degree of unsaturation without the danger of premature gelation using the "two stage" process of the present invention. It is postulated that this is due to the fact that the highly reactive unsaturated molecules are subjected in the "two stage" process to relatively short periods at temperatures which would normally produce gelation rapidly with said highly reactive unsaturated molecules.

The length of the reaction period depends on such factors as the specific reactants employed, the temperature at which the reaction is conducted, the actual vacuum employed, and the nature and amount of the catalyst employed. Depending on the other factors, the reaction time at 200° C. will be from about 1 to about 8 hours. When employing the preferred ratios of hydroxyl to carboxyl groupings in the reactants, water is the only by-product and the course of the reaction can be followed by determining the amount of water produced.

It has been found that the optimum block formation is obtained if the reaction mixture is heated at reaction temperature until the viscosity of the reaction mixture reaches a value the same as the viscosity of the saturated polyester originally charged. This represents a very convenient method of control.

If the reaction time be increased beyond the point of maximum block polyester formation, then regrouping of the polymer units can occur, with loss of the maximum effects of block polymerization. Thus, prolonged reaction times can result in the formation of more random structures than the optimum which, using the same terminology as used hereinbefore, can be represented by the general formula:

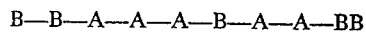

B—B—A—A—A—B—A—A—BB

One control method which has been employed is to react the "two stage" polymer to the same viscosity as a "one stage" polymer of the same composition. In general, this gives the maximum improvement in the desired physical properties. However, reaction can be continued in the "two stage" process to get higher viscosity and higher molecular weight without gelation because the "two stage" reaction employs higher molecular weight starting reactants and, as disclosed hereinbefore, maintains the reactants at reaction temperatures for a shorter period of time.

Block or "two stage" polyesters are more reactive than a "one stage" polyester made with the same amount of the unsaturated component. This is because there is substantially no cross-linking in the case of the "two stage," whereas a portion of the unsaturated component in the "one stage" is expended in unwanted cross-linking.

"One stage" process unsaturated polyesters are commonly employed in combination with monoethylenically unsaturated monomers for the production of cross-linked thermoset plastic compositions in a variety of shapes and forms. The unsaturated polyesters of this invention are uniquely suited for such applications, producing cross-linked thermoset plastic compositions with enhanced physical properties hitherto unattainable. Suitable monoethylenically unsaturated monomers for use with the unsaturated polyesters of the present invention include methyl methacrylate, methyl acrylate, ethyl acrylate, ethyl methacrylate, ethyl ethacrylate, styrene, methylstyrene, vinyltoluene, vinylnaphthalene and similar unsaturated monomers. High boiling dialkenyl carboxylates such as diallyl phthalate may also be employed. Mixtures of these monomers may also be used in conjunction with the unsaturated polyester.

The ratio of the unsaturated polyester to monoethylenically unsaturated monomers or mixtures thereof may be varied widely depending on the specific properties required and the unsaturated polyester content of the polyester-monomer mixture may vary from about 30% to about 80% by weight. A preferred range of unsaturated polyester content is from about 50% to about 70% by weight of the total polyester-monomer mixture.

If the solutions of the polyester in monomer are not to be used shortly after their preparation, they must be either refrigerated or inhibited. Refrigeration is a suitable method of controlling small lots, but commercial lots are chemically inhibited. Hydroquinone or benzoquinone are suitable inhibitors generally being used at a level of 0.005 to about 0.05% on the total weight of the resin solution. The inhibitors are later destroyed by the addition of catalyst.

These polyester-monomer mixtures are cured or polymerized by a variety of methods well-known to those skilled in the art. Exposure to elevated temperatures, exposure to ultraviolet light, with or without catalysts, such as organic peroxides, with or without accelerators, such as organic solvent-soluble heavy metal salts, represent commonly employed methods. Prior to curing, fillers, pigments and/or dyes may be incorporated. Reinforcing with fibers or fabrics of glass, asbestos, sisal, nylon, for example, is a common practice.

The thermoset plastic compositions obtainable from copolymerizing the unsaturated polyesters of the present invention with monomers as hereinbefore described exhibit superior physical properties when compared with thermoset plastic compositions of the same chemical composition prepared in the same manner from "one stage" process unsaturated polyesters. The thermoset plastic compositions from the polyesters of the present invention show:

Higher tensile and flexural strength,
Higher modulus of elasticity,
Higher elongation,
Higher impact strength, and
Superior electrical properties.

The overall improvements can be summarized as a marked improvement in the property "toughness," a term well-known to those skilled in the art. A comparison of these properties is set forth in Table I.

The uses for polyester-monomer combinations are well-known to those skilled in the art, and, as indicated hereinbefore, the polyesters of the present invention can be employed in the same manner. Thus, combinations of the polyesters of the present invention with styrene or vinyl toluene, with or without the addition of monomers, such as methyl methacrylate, can be applied to glass fabrics or glass mats and cured in a variety of ways to produce useful attractive shaped objects. The type of objects so produced varies widely from helmets to chairs to corrugated panels suitable for awnings to ducting for use under corrosive conditions, etc. When suitably filled with a combination of an inert mineral filler and fibrous materials, such as glass fibers, asbestos, sisal, etc., the doughy mass so produced can be molded in a variety of ways to produce a wide variety of molded parts.

The details and methods of practicing the invention will be apparent by reference to the following specific examples, it being understood that these examples are merely illustrative embodiments of the invention and that the scope of the invention is not limited thereto.

EXAMPLE 1

A typical high molecular weight linear polyester, free from non-benzenoid unsaturation, was prepared as follows: To 508 parts of propylene glycol were introduced 783 parts of adipic acid and 1.1 parts of 72° Bé. zinc chloride. Stirring and heating were applied until distillation began at about 140° to about 150° C. The temperature was allowed to rise until a maximum temperature of 200° to 210° C. was reached. Vacuum was applied with the temperature remaining at maximum during which time distillation continued. When distillation had substantially stopped and when the desired degree of polymerization was reached, the batch was cooled to 160° to 170° C. Most of the theoretical quantity of distillate (water and excess propylene glycol) had been removed (275 parts or at least 95%) at this itme. The polyester product had a Gardner-Holdt viscosity of S–U (50% in ethylene dichloride). The acid number was 1.1.

EXAMPLE 2

A typical monoglycol ester of an α,β-monoethylenically unsaturated dicarboxylic acid was prepared as follows: A mixture of 804 parts of ethylene glycol and 225 parts of maleic anhydride was stirred and heated. The temperature was maintained at 60° to 70° C. and after three to four hours the hydroxyethyl maleate so formed had an acid number of 350 and was allowed to cool to room temperature.

EXAMPLE 3

A typical polyester formed by the reaction of glycols or mixtures thereof with α,β-monoethylenically unsaturated dicarboxylic acids was prepared as follows: A mixture of 459 parts of ethylene glycol and 690 parts of maleic anhydride was stirred and heated. Heating was continued until distillation began at about 150° to 160° C. Moderate heating was maintained. Distillation was continued until the temperature of the batch was 180° C. Heating was then continued until the desired degree of polymerization was obtained. The polyester so produced had an acid number of 45.8 and a Gardner-Holdt viscosity (60% in dimethyl formamide) of G, and was then cooled to room temperature.

EXAMPLE 4

A typical bisglycol ester of an α,β-monoethylenically unsaturated dicarboxylic acid was prepared as follows: To 688 parts of propylene glycol, 500 parts of fumaric acid was introduced. Stirring and heating were applied and continued until distillation began at about 150° C. The temperature was raised as set forth in Example 3 to a maximum of 200° C. When an acid number of 3.9 was obtained, the batch was cooled and dropped into a container. Final Gardner-Holdt viscosity of the "as is" material was Z.

EXAMPLE 5

A styrene solution of a typical two-stage polyester was prepared as follows: A mixture of 407 parts of material prepared as set forth in Example 1, 393 parts of hydroxypropyl acid maleate, prepared by the process as set forth in Example 2, and 0.86 part of a 72° Bé solution of zinc chloride was stirred and heated and the temperature raised to a maximum of 200° C. After this temperature had been reached, vacuum was applied until a pressure of 5 mm. of mercury was reached. The batch was held at 200° C./5 mm. of mercury until the Gardner-Holdt viscosity (50% in ethylene dichloride) reached that of the material prepared as set forth in Example 1, i.e. S–U. At this time, the acid number was 6.7. The polyester was then blended with 325 parts of styrene monomer to give a Gardner-Holdt viscosity of Z–1 and an acid number of 4.7.

EXAMPLE 6

To 473 parts of hydroxyethyl acid maleate (prepared as set forth in Example 2), 180 parts of poly(ethylene adipate) (prepared as set forth in Example 1), and 0.7 part of a 72° Bé. solution of zinc chloride were added. The reaction was carried out as set forth in Example 5. The finished polyester was blended with 600 parts of styrene monomer. Gardner-Holdt viscosity was Z–4 and acid number was 8.0.

EXAMPLE 7

There was introduced 403 parts of hydroxyethyl acid maleate into 498 parts of poly(2,2-diethyl propanediol isosebacate), prepared as set forth in Example 1. The reaction was carried out as set forth in Example 5. The material blended with 360 parts styrene monomer to give a blend having a Gardner-Holdt viscosity of Z–5 and an acid number of 7.0.

EXAMPLE 8

There were mixed 400 parts of poly(propylene adipate), prepared as set forth in Example 1, 100 parts of bis(hydroxypropyl fumarate), prepared as set forth in Example 4, and 0.5 parts of a 72° Bé. solution of zinc chloride. The reaction was carried out as set forth in Example 5. The finished polyester was blended with 445 parts of styrene monomer to give a Gardner-Holdt viscosity of M and an acid number of 2.2.

EXAMPLE 9

There were mixed 925 parts of poly(propylene adipate), prepared as set forth in Example 1, and 800 parts of poly(propylene maleate). Stirring and heating were applied and continued to a maximum temperature of 200° C. The batch was held at 200° C. for 0.5 hour. The batch was then blended with 740 parts of styrene to give a Gardner-Holdt viscosity of Z and an acid number of 19.7.

EXAMPLE 10

There were mixed 283 parts of hydroxyethyl acid maleate, 350 parts of poly(propylene isophthalate), prepared by the process as set forth in Example 1, 0.68 part of a 72° Bé. solution of zinc chloride. The reaction was carried out as set forth in Example 5. The polyester was blended with 258 parts of styrene monomer. Final Gardner-Holdt viscosity was Z–5 and the acid number was 13.0.

EXAMPLE 11

Into 100 grams of the polyester-styrene solution, prepared as set forth in Example 6, were mixed 2 parts of a 1:1 dispersion of benzoyl peroxide in tricresyl phosphate and 0.5 part t-butyl perbenzoate. The mixture was cured in an oven over a 70° to 120° C. range. The resulting casting was tough, clear and hard (15 on the Barcol scale).

EXAMPLE 12

Into 100 grams of the polyester-styrene solution, prepared as set forth in Example 6, was mixed one part of cobalt naphthenate (6% metal) and one part of a 60% solution of methyl ethyl ketone peroxide in dimethyl phthalate. A film of this blend was spread on a glass plate and allowed to cure at room temperature. In less than one hour, the film was tack-free.

EXAMPLE 13

There were mixed 865 parts of propylene glycol, 302.5 parts of ethylene glycol, 1300 parts of succinic anhydride and 1.85 parts of a 72° Bé. solution of zinc chloride. The reaction was carried out as set forth in Example 1. The polyester so produced was cooled, vented, and dropped into a container. It had a Gardner-Holdt viscosity of B (30% in ethylene dichloride) and an acid number of 4.1.

EXAMPLE 14

There were mixed 407 parts of polyester prepared as set forth in Example 13, 393 parts of hydroxypropyl acid maleate, prepared as set forth in Example 2, and 0.86 part of a 72° Bé. solution of zinc chloride. The reaction was carried out as set forth in Example 5. The finished resin was blended with 325 parts of styrene monomer to give a Gardner-Holdt viscosity of Z and an acid number of 11.0.

EXAMPLE 15

There were mixed 292 parts of material prepared as set forth in Example 1, 508 parts of hydroxypropyl acid maleate, which was prepared by the process as set forth in Example 2, and 0.86 part of a 72° Bé. solution of zinc chloride. The reaction was carried out as set forth in Example 5. The resin so produced was subsequently blended with 320 parts of styrene monomer to give a Gardner-Holdt viscosity of I and an acid number of 8.0.

EXAMPLE 16

A mixture of 400 parts of poly(propylene phthalate), 350 parts of hydroxypropyl acid maleate and 0.8 part of zinc chloride, 72° Bé. solution, were stirred together with heating.

The poly(propylene phthalate) was prepared by the process as set forth in Example 1, but using phthalic anhydride and propylene glycol. The process for the preparation of hydroxypropyl maleate was described in Example 2. Heating was continued until distillation began at about 160° to 170° C. Heating was then maintained until a pot temperature of 200° C. was reached. Vacuum was then applied until a pressure of 10 to 20 mm. was reached. The reaction was terminated when the Gardner-Holdt viscosity obtained was equal to that of the original saturated starting poly(propylene phthalate), namely, about F (50% in ethylene dichloride).

The finished resin was then blended with 306 parts of styrene to give an acid number of 12.4.

EXAMPLE 17

There were mixed 439.3 parts propylene glycol, 409 parts phthalic anhydride, and 270.4 parts of maleic anhydride. Stirring and heating were applied as in Example 16. When a temperature of 190° to 200° C. was reached, the stirring and heating were continued until an acid number of less than 50 was obtained. The finished polyester was blended with styrene to a 70/30 polyester/styrene ratio.

EXAMPLE 18

The process as set forth in Example 16 is typical of the "two stage" process, while the process as set forth in Example 17 is a "one stage" process. Thus, as postulated hereinbefore, the former process should produce a block polyester with controlled configuration, while the latter should give an uncontrollable random structure, with less efficient use of the unsaturated dicarboxylic acid due to cross-linking during preparation. To demonstrate this, samples of polyesters prepared according to Examples 16 and 17, identical in chemical composition and differing only in the process employed for their preparation, were cut with styrene to 70% solutions. These solutions were catalyzed by the addition of 1% benzoyl peroxide by weight, and then cured by heating in an oven between glass plates under the following heating cycle: 6 hours at 60° C., heated to 120° C. over a 2-hour period, maintained at 120° C. for two hours, and then allowed to cool. The demolded pieces were subjected to a number of tests, employing standard A.S.T.M. test procedures. The data from these tests appear in Table I.

*Table I*

|  | Resin from Example 16 | Resin from Example 17 |
| --- | --- | --- |
| Grams maleic anhydride/100 grams polyester | 27.0 | 27.0 |
| Polyester/styrene ratio | 70/30 | 70/30 |
| Reactivity, 180° F., 1% benzoyl peroxide: | | |
| Induction, mins | 1.6 | 2.8 |
| Propagation, mins | 1.5 | 2.5 |
| Exotherm, °F | 385 | 352 |
| Tensile strength, p.s.i. | 10,010 | 9,160 |
| Elongation at break, percent | 1.8 | 1.6 |
| Impact strength (Charpy unnotched) ft. lb. ½″ x 1″ section | 8.1 | 5.0 |
| Heat distortion temperature, ° C. (264 p.s.i.) | 92 | 83 |
| Water resistance 100° C. for 24 hours, gain in soak, 1% | 2.52 | 3.63 |
| Total Gain, 1% | 2.52 | 3.79 |

The more efficient utilization of the maleic anhydride in the "two stage" polyester proceeds is clearly demonstrated by the greater reactivity of the styrene solution of the "two stage" polyester as shown by the much shorter induction and propagation times and by the substantially higher exotherm. Another excellent indicator which shows that the unsaturated dicarboxylic acid has not been wasted by cross-linking during the preparation of the two stage is the substantially higher heat distortion temperature of the resin prepared by polymerizing the styrene solution of the "two stage" polyester. Since cross-linking in the final polymer is thought to contribute to higher heat distortion temperatures, the higher unsaturation available in the "two stage" resin is clearly shown by these values.

The physical properties presented in Table I clearly show the improved "toughness" characteristics of the resin.

The improved water resistance is clearly evident from the figures in Table I.

As indicated hereinbefore, polyesters containing unsaturation are widely used in conjunction with monoethylenically unsaturated monomers to produce mixtures or solutions which, when polymerized, produce plastics with a wide spread of physical properties depending upon the particular polyester and the particular monomer employed. For instance, using a polyester based on phthalic anhydride, propylene glycol, and maleic anhydride and employing styrene as the monomeric material, a rigid thermoset polymer can be obtained on polymerizing such a solution employing the free radical technique. Various reinforcing materials may be used, a common one being glass fabric or glass fibers, or glass mat. Corrugated sheets for awnings and for structural purposes, flat sheets for industrial glazing, molded articles, such as chairs, helmets, and meter box housings can be formed using mat for reinforcing, the resulting cured products being light and strong and, when pigmented, having a built-in color.

The block polyesters of this invention may be employed in the same fashion as the "one stage" polyesters used today, producing superior cured compositions by virtue of the higher reactivity. Conversely, should it be desired to match the reactivity of a "one stage" polyester, it may be done by the use of less maleic acid.

I claim:

1. A process for the preparation of substantially linear high molecular weight unsaturated polyesters with controlled molecular configuration which consists essentially of reacting a high molecular weight linear condensation polyester free from nonbenzenoid unsaturation, the molecule chains of which are terminated with a grouping selected from the group consisting of hydroxyl and carboxyl, with a compound selected from the group consisting of a monoglycol ester of $\alpha,\beta$-monoethylenically unsaturated dicarboxylic acids, a bisglycol ester of $\alpha,\beta$-monoethylenically unsaturated dicarboxylic acids, and a polyester formed by the reaction of glycols or mixtures thereof with $\alpha,\beta$-monoethylenically unsaturated dicarboxylic acids, said polyester molecule chains being terminated with a grouping selected from the group consisting of hydroxyl and carboxyl, at a temperature of from about 150° to about 250° C.

2. The process as set forth in claim 1 in which the reaction is carried out in vacuo.

3. The process as set forth in claim 1 in which the temperature is from about 190° to about 220° C.

4. The process as set forth in claim 1 in which the molecular weight of the linear polyester free from non-benzenoid unsaturation is from about 1,000 to about 10,000.

5. The process as set forth in claim 1 in which the molecular weight of the linear polyester free from non-benzenoid unsaturation is from about 2,000 to about 5,000.

6. The process as set forth in claim 1 in which the ratio of the $\alpha,\beta$-monoethylenically unsaturated dicarboxylic acid to the acid free from non-benzenoid unsaturation is from about 2:98 to about 70:30.

7. The process as set forth in claim 1 in which the molecular weight of the polyester formed by the reaction of glycols or mixtures thereof with an $\alpha,\beta$-monoethylenically unsaturated dicarboxylic acid is from about 300 to about 4000.

8. The process as set forth in claim 1 in which an esterification catalyst is employed.

9. The process as set forth in claim 8 in which the catalyst is zinc chloride.

10. A process for the preparation of substantially linear high molecular weight unsaturated polyesters with controlled molecular configuration which consists essentially of reacting a high molecular weight linear condensation polyester, free from non-benzenoid unsaturation, the molecule chains of which are terminated with a grouping selected from the group consisting of hydroxyl and carzboxyl, the ratio of hydroxyl to carboxyl groupings being from about 0.8 to 1 to about 1:0.8 with a monoglycol ester of $\alpha,\beta$-monoethylenically unsaturated dicarboxylic acids at a temperature of from about 150° to about 250° C.

11. A process for the preparation of substantially linear high molecular weight unsaturated polyesters with controlled molecular configuration which consists essentially of reacting a high molecular weight linear condensation polyester, free from non-benzenoid unsaturation, the molecule chains of which are terminated with a grouping selected from the group consisting of hydroxyl and carboxyl, the ratio of hydroxyl to carboxyl groupings being from about 0.8 to 1 to about 1 to 0.8 with the polyester formed by the reaction of glycols or mixtures thereof with $\alpha,\beta$-monoethylenically unsaturated dicarboxylic acids, said unsaturated polyester being terminated with a grouping selected from the group consisting of hydroxyl and carboxyl, the ratio of hydroxyl to carboxyl groupings being from about 0.8 to 1 to about 1 to 0.8, at a temperature of from about 150° to about 250° C.

12. A process for the preparation of substantially linear high molecular weight unsaturated polyesters with controlled molecular configuration which consists essentially of reacting a high molecular weight linear condensation polyester, free from non-benzenoid unsaturation, the molecule chains of which are terminated with hydroxyl groupings, with the monoglycol ester of $\alpha,\beta$-monoethylenically unsaturated dicarboxylic acids at a temperature of from about 150° to about 250° C.

13. A process for the preparation of substantially linear high molecular weight unsaturated polyesters with controlled molecular configuration which consists essentially of reacting a high molecular weight linear condensation polyester, free from non-benzenoid unsaturation, the molecule chains of which are terminated with hydroxyl groupings with the polyester formed by the reaction of glycols or mixtures thereof with $\alpha,\beta$-monoethylenically unsaturated dicarboxylic acids, said unsaturated polyester being terminated with a grouping selected from the group consisting of hydroxyl and carboxyl, the ratio of hydroxyl to carboxyl groupings being from about 0.8 to 1 to about 1 to 0.8 at a temperature of from about 150° to about 250° C.

14. A product prepared by the process set forth in claim 1.

15. A product prepared by the process set forth in claim 10.

16. A product prepared by the process set forth in claim 11.

17. A product prepared by the process set forth in claim 12.

18. A product prepared by the process set forth in claim 13.

19. A product prepared by the process set forth in claim 1 in which the high molecular weight linear polyester free from non-benzenoid unsaturation is polypropylene adipate.

20. A product prepared by the process set forth in claim 1 in which the high molecular weight linear polyester free from non-benzenoid unsaturation is polyethylene sebacate.

21. A product prepared by the process set forth in claim 1 in which the high molecular weight linear polyester free from non-benzenoid unsaturation is polypropylene phthalate.

22. A product prepared by the process set forth in claim 1 in which the monoglycol ester of the $\alpha,\beta$-monoethylenically unsaturated dicarboxylic acid is hydroxypropyl acid maleate.

23. A product prepared by the process set forth in claim 1 in which the monoglycol ester of the $\alpha,\beta$-monoethylenically unsaturated dicarboxylic acid is hydroxyethyl acid maleate.

(References on following page)

References Cited in the file of this patent

UNITED STATES PATENTS

| | | |
|---|---|---|
| 2,255,313 | Ellis | Sept. 9, 1941 |
| 2,498,533 | Dimpfl | Feb. 21, 1950 |
| 2,780,613 | Rubens | Feb. 5, 1957 |
| 2,806,835 | Nischk et al. | Sept. 17, 1957 |
| 2,806,836 | Nischk et al. | Sept. 17, 1957 |
| 2,824,821 | Nischk et al. | Feb. 25, 1958 |

FOREIGN PATENTS

| | | |
|---|---|---|
| 743,514 | Great Britain | Jan. 18, 1956 |
| 759,328 | Great Britain | Oct. 17, 1956 |

OTHER REFERENCES

Valentine: "Recent Developments in Copolymers," Fibers (Natural and Synthetic), February 1955, pages 60–63, page 61 relied upon.

Immergut et al.: "Die Makromolekulare Chemie" 18/19, pages 322–341 (1956), pages 334–336 relied upon.